United States Patent [19]

Nelson

[11] Patent Number: 4,582,249
[45] Date of Patent: Apr. 15, 1986

[54] ZONE CONTROL SYSTEM FOR ENERGY CONSERVATION

[75] Inventor: Lorne W. Nelson, Bloomington, Minn.

[73] Assignee: Honeywell Inc., Minneapolis, Minn.

[21] Appl. No.: 682,518

[22] Filed: Dec. 17, 1984

[51] Int. Cl.[4] ............................................. F24F 3/00
[52] U.S. Cl. ................................. 236/46 R; 165/22; 236/68 B
[58] Field of Search .................... 236/68 B, 49, 46 R; 165/22, 12

[56] References Cited

U.S. PATENT DOCUMENTS

| | | | |
|---|---|---|---|
| 3,206,120 | 9/1965 | Carlson | 236/68 B |
| 3,567,115 | 12/1970 | Nelson | 236/1 |
| 4,479,604 | 10/1984 | Didner | 236/49 |

Primary Examiner—William E. Wayner
Attorney, Agent, or Firm—Alfred N. Feldman

[57] ABSTRACT

A multizone control system utilizes a series of timers to ensure that all of the heat supplied to the system is utilized. Timers are used to control transfer of heat from the temperature modifying plant to the zones. The timers are further arranged to bring "on" additional heat to the heat anticipator of the zone of lower demand thereby tending to synchronize the operation of zones and allow for more efficient supply of the heat exchange medium throughout the areas being controlled.

8 Claims, 1 Drawing Figure

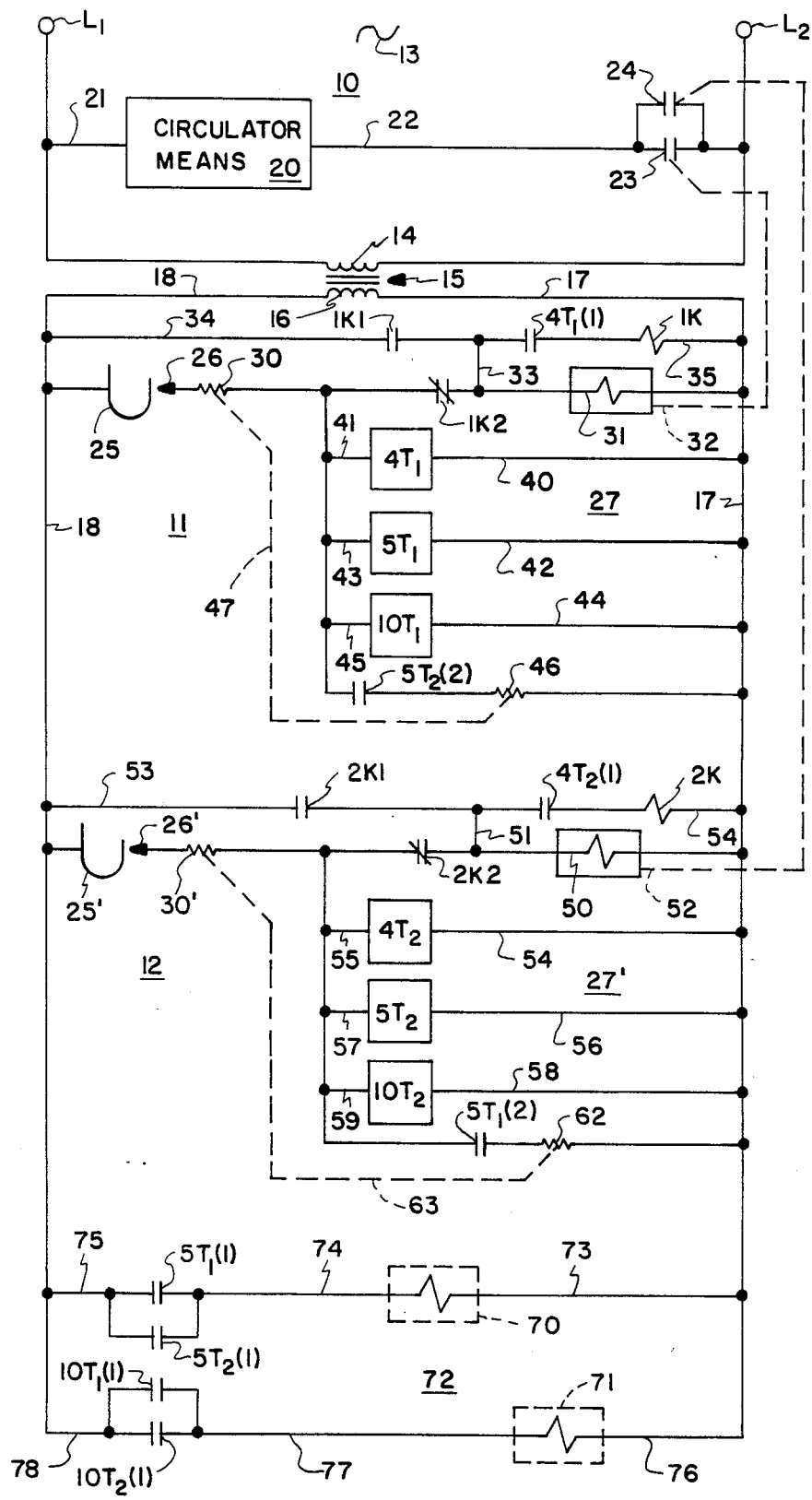

ZONE CONTROL SYSTEM FOR ENERGY CONSERVATION

BACKGROUND OF THE INVENTION

Typically, a zone control system includes two or more zones in a building and each zone includes a thermostat for control of the temperature in the individual zone. The zone control systems can be warm air heated, hydronic or hot water heated, or cooled by an air conditioning type of system. While many different types of heating and cooling apparatus can be used, the most common includes a furnace and/or cooling coil to temper air that in turn is circulated by a fan in duct work. The duct work has dampers to control the flow of the air to the individual zones. While many different types of systems can be used, and are contemplated within the present invention, the present discussion will use the terminology of a hot air system in which heated air is circulated. This will simplify the description.

Typically when a multizone system is operated, the thermostats call for heat and a fan circulates the heated air to the zone which initiated the call for heat. The zone normally will have a damper that is driven to an open position. When the zone that is calling for heat is satisfied, the furnace would be turned off and the damper driven to a closed position. This typically leaves a substantial amount of residual heat at the furnace and much of this heat is lost up the stack while the furnace is waiting for the next call for heat.

Another type of loss in this type of a system is a random operation of the dampers for the individual zones without regard to the prior operation of any of the other zones in the system. This random operation is undesirable and tends to be an energy wasting type of operation. Prior art arrangements have recognized the desirability of synchronizing the operation of various zone dampers, but the loss of heat that remains at the furnace when the systems are turned off still has been ignored.

SUMMARY OF THE INVENTION

The present invention is directed to a multizone control system that is capable of being applied to any type of temperature modifying plant that modifies the temperature of a heat exchange medium and operates a circulator means to circulate the heat exchange medium to different zones. The zones individually have flow control means. In the present invention a series of timing functions are provided that allow for the circulation of the residual heat in the temperature modifying plant or furnace to a zone so that that heat is not lost or wasted. The timing functions then provide for the initiation of the operation of the temperature modifying plant to add heat when necessary. Also, the timing functions provide for the operation of a heating load in the thermostats that are not calling for heat in order to offset their temperature control so that they do not inadvertently call for operation in an unsynchronized manner.

The present invention can be applied to any type of heating plant, cooling plant, and in any type of multizone control. The invention has been specifically disclosed in a two zone system, but can be obviously expanded to a system having more zones merely be adding further thermostats and equipment of the type disclosed in connection with the two zone thermostats specifically shown.

In accordance with the present invention there is disclosed a zone control system adapted to control temperatures in a building having a temperature modifying plant to modify the temperature of a heat exchange medium, circulator means to circulate said medium, and flow control means to regulate the flow of said medium, including: a plurality of zone thermostats with one thermostat per controlled zone, and with each thermostat including temperature responsive means and heat anticipator means to modify the temperature of said temperature responsive means; at least one of said flow control means per controlled zone, and each of said flow control means being capable of energizing said circulator means when said flow control means operates to permit circulation of said heat exchange medium; each zone thermostat including on-off timer means having normally open switch means, and further including intermediate on timer means having normally open switch means; first zone control circuit means including a temperature responsive means of said first thermostat, a heat anticipator means of said first thermostat, and circuit means with normally closed switch means capable of energizing a first flow control means to an open position upon said first thermostat calling for operation of said temperature modifying plant; said timer means of said first thermostat being actuated by said first thermostat calling for operation of said temperature modifying plant; a first of said on-off timer means operating its switch means to an on state after a fixed time interval to latch said first flow control means into an open condition; a first of said intermediate on timer means operating its switch means to an on state after a second fixed time interval to energize said modifying plant and complete a circuit to a secondary anticipation heater of a second zone thermostat capable of adding heat to said second zone thermostat; and said first on-off timer means maintaining its switch means closed for a fixed time interval after said first zone control circuit means is opened by the operation of said first thermostat to ensure that said first flow control means remains open for a fixed time to allow said circulator means to circulate said heat exchange medium.

BRIEF DESCRIPTION OF THE DRAWING

The single FIGURE discloses a schematic of a two zone control system.

DESCRIPTION OF THE PREFERRED EMBODIMENT

The disclosed invention is applicable to any type of zone control of heating or cooling. The system can be utilized in typical warm, forced air type systems or in hydronic type systems. In the present disclosure of the invention, the device will be described as applied to a forced air heating type system for convenience of explanation. This is not intended to be in any way a limitation on the application of the zone control system. Further, the disclosure will be limited to a two thermostat type of system but can be readily extended to a system having more thermostats and zones than the two specifically described. The extension of the invention will be quite obvious. Also, the disclosure will be in the form of an electromechanical type of thermostat and control system, but can be readily implemented in an all electronic configuration. With this initial background the specifics of a two zone control system will now be explained in detail.

A two zone temperature control system is generally disclosed at 10 with a first zone control thermostat disclosed at 11, and a second zone control thermostat disclosed at 12. The zone control system 10 includes the application of conventional power 13 on conductors $L_1$ and $L_2$ at line voltage to a primary winding 14 of a step-down transformer generally disclosed at 15. The step-down transformer 15 has a secondary winding 16 that supplies a low voltage control potential on the conductors 17 and 18.

Connected between the main power lines $L_1$ and $L_2$ is a circulator means 20 that would typically be the blower in a forced air furnace in a hot air system. The circulator means 20 is connected by conductor 21 to line $L_1$, while it is connected through a conductor 22 to a pair of contacts 23 and 24 to the other side of the line $L_2$. It is apparent that any time either of the contacts 23 or 24 becomes closed, that the circulator means or fan 20 is activated to move the air in the forced air system. The contacts 23 and 24 are operated from dampers in the two zones controlled by the thermostats 11 and 12. Details for this will be supplied subsequently.

The first zone control thermostat 11 operates in the first of two of the zones, while the zone control thermostat 12 operates in a second zone. The first zone control thermostat 11 contains a bimetal operated element generally disclosed at 25 that has a contact structure 26 that responds to the operation of the element 25. The thermostat 11 has an anticipation heater 30, which is conventional. The element 25 is connected between the line 18 and the balance of the zone control thermostat 11. The zone control thermostat 11 includes a first zone damper 31 that has an operating mechanism 32 that is connected to the switch 23. The switch 23 is caused to close whenever the damper 31 is energized to open the damper 31. The damper 31 is electrically connected to a normally closed contact 1K2 of a relay 1K that is in turn connected between the conductors 17 and 18 through a timer contact $4T_1(1)$, and a normally open relay contact 1K1 of the relay 1K. A common connection is provided between the normally closed relay contact 1K2 and the timer contact $4T_1(1)$ by a conductor 33. A circuit is completed between the normally open relay contact 1K1 and the conductor 18 by a conductor 34, and by the relay 1K being connected to the conductor 17 by a conductor 35.

The zone thermostat 11 further includes a timer means 27 made up of three timers. The first of the timers $4T_1$ is a four minute delay on-off timer or merely can be considered as an on-off timer means. The timer $4T_1$ has a single normally open contact $4T_1(1)$ that has been previously mentioned as connected between the relay 1K and the relay contact 1K1. The timer $4T_1$ is connected by conductors 40 and 41 between the heat anticipator 30 and the conductor 17.

A second timer $5T_1$ is connected by conductors 42 and 43 in parallel with the timer $4T_1$, and is a five minute delay for on timer and will be referred to as an intermediate on timer means. The intermediate on timer means $5T_1$ has two normally open contacts that are applied to circuitry that will be described below.

A third timer $10T_1$ is connected by conductors 44 and 45 in parallel with the other timers, and it includes a single normally open contact that will be later described.

Completing the zone control thermostat 11 is a normally open contact $5T_2(2)$ that is connected to a heater resistor 46 and this parallel combination is connected across the timers $4T_1$, $5T_1$, and $10T_1$. The resistor 46 is in a heat exchange relationship with the heat anticipator 30 as shown at 47. When the contact $5T_2(2)$ is closed (along with thermostat 11), the resistor 46 can draw current and the heat generated by the resistor 46 is communicated to the heat anticipator 30. The purpose of this function will be described in connected with the operation of the complete system.

The second zone control thermostat 12 includes elements that are identical to the first and will merely be given appropriate reference numbers so that they can be discussed in connection with the operation. The bimetal operated element 25' has a normally open switch 26' and a heat anticipator 30'. The element 25' is connected through the heat anticipator 30' to a normally closed relay contact 2K2 that in turn is connected to a damper 50 that is shown connected at 51 to the switch 24. The damper 50 operates through the connection 51 to close the switch 24 any time the damper 50 is operated. The damper 50 is connected through a conductor 51 to a common point between a normally open contact $4T_2(1)$ and a normally open relay contact 2K1 of the relay 2K. The contact 2K1 is connected by a conductor 53 to the power conductor 18 so that a series energizing circuit for the relay 2K can be completed through the relay contact 2K1, the timer contact $4T_2(1)$ and the relay 2K. The relay 2K is connected by a conductor 54 to the other power conductor 17. It will be noted that the relay configuration and timer contacts of the zone control thermostat 12 are the same as that of the zone control thermostat 11. Connected between the heat anticipator 30' and the conductor 17 are three timers $4T_2$ which is connected by the conductors 54 and 55 to be energized whenever the heat anticipator 30' is energized. The timer $4T_2$ has a single normally open contact $4T_2(1)$. The timer $4T_2$ again is a four minute delay on-off type timer that will be referred to as an on-off timer means which forms part of an overall timer means 27'. The timer means 27' further includes the five minute delay for on timer or intermediate timer means $5T_2$ which is connected by conductors 56 and 57 in parallel with the timer $4T_2$. The intermediate timer means $5T_2$ includes two contacts $5T_1(1)$ and $5T_2(1)$. The timer means 27' is completed by a timer $10T_2$ that is connected by conductors 58 and 59 in parallel with the other timers in the timer means 27'. The extended on timer means $10T_2$ has a single contact $10T_2(1)$. The zone thermostat 12 is completed by a heater resistor 62 which is shown as having a heat exchange relationship 63 to the heat anticipator 30' of the zone control thermostat 12.

It will be noted that the zone control thermostats 11 and 12 are identical in makeup and the number of zones involved in a system can be extended by providing additional zone control thermostats with the appropriate contact structure.

The zone control system is completed by providing two different capacity temperature modifying elements 70 and 71 which form part of a temperature modifying plant generally disclosed at 72. Normally the element 70 would be a relay controlling a low fire burner in a gas fired forced air furnace, while the element 71 would be a high fire burner. The low fire burner control 70 is connected by a conductor 73 to the power conductor 17, while the other side is connected by conductor 74 to the previously noted timer contacts $5T_1(1)$ and $5T_2(1)$. These contacts are in turn connected at 75 to the conductor 18. It is obvious that when either of the contacts $5T_1(1)$ or $5T_2(1)$ are closed, that the low fire burner 70 is operated.

Connected in parallel with the low fire burner control configuration of the plant 72 is the high fire burner 71 which is connected by conductor 76 to conductor 17 and by a further conductor 77 to the parallel combination of the contacts $10T_1(1)$ and $10T_2(1)$. A further conductor 78 completes the circuit to the power conductor 18. It is thus apparent when either of the timer contacts $10T_1(1)$ or $10T_2(1)$ are closed that the high fire burner 71 is in operation.

SYSTEM OPERATION

Upon a call for heat from any of the single stage zone thermostats 11 or 12, the appropriate timer means 27 or 27' and its associated damper 31 or 50 is operated. It will be assumed that the zone thermostat 11 has a call for heat. As such, the contact 26 closes to element 25 and a complete circuit is provided through the heat anticipator 30, the normally closed relay contact 1K2 and the damper 31. At this same time the timer means 27 is energized and the three timers begin to operate. Energizing the four minute timer $4T_1$ will cause contact $4T_1(1)$ to close thereby permitting a holding circuit for relay 1K to be energized. The holding circuit is provided through the conductor 33 and the now closed contact $4T_1(1)$. The operation of the relay 1K latches itself in through the closing of contact 1K1, while the contact 1K2 opens. This provides an energizing circuit for the timer means 27 and a holding circuit to the damper 31.

Energizing the damper 31 to an open position would permit warm air (if available) to flow to the first zone to satisfy the zone heating requirements. This is accomplished by the switch 23 closing, and the circulator means or fan 20 becoming operational. This operation moves any residual heat in the heating plant to the zone first calling for heat. This typically would occur while the thermostat 11 was cycling on-off with a duty cycle of approximately 50 percent or less. If the duty cycle of the zone thermostat calling for heat exceeds approximately 50 percent, the thermostat would remain on for a five minute interval, thereby permitting operation of the intermediate on timer $5T_1$. When the timer $5T_1$ operates, it closes contact $5T_1(1)$ energizing the low fire portion 70 of the heat modifying plant 72.

Concurrently with the operation of the low fire heating plant 70, the contact $5T_1(2)$ is closed and sets up a circuit to provide a higher level of current and heat dissipation in the heat anticipator 30' of the second zone thermostat 12 if it simultaneously is calling for heat. This additional heat in the zone thermostat 12 would tend to shut "off" the zone thermostat 12, which by implication of the high duty cycle, is the zone of lower heating demand. This synchronization of heat in the other zone thermostats tends towards synchronization of the cycling operation of the various zone thermostats in the entire system. This permits the most air flow through the heat exchanger during a burner operation, and further minimizes the cost of operation of the blower by permitting it to shut off during timers when no zone thermostat is calling for heat.

If the zone calling for heat is not satisfied within the time for the extended on timer means $5T_1$, which has been indicated as 10 minutes, the timer means $10T_1$ would operate and its contact $10T_1(1)$ would close to energize the high fire burner 71 of the temperature modifying plant 72.

After the zone is satisfied and the zone thermostat 11 stops calling for heat, the zone damper 31 is kept open by the operation of the on-off timer means $4T_1$ for a convenient period of time, normally four minutes. This permits the circulator means or blower 20 to continue to operate thereby delivering the heat that is at the heat exchanger so that it is not lost in the system, thereby permitting maximum energy conservation.

The operation of either of the two zone control thermostats 11 or 12 is the same, and can be operated in a reverse manner. As previously indicated, this system could be extended to three or more zones if desired merely by the addition of contacts being operated by the individual timers of the timer means 27 and 27'. As also was indicated at the introduction of the description, the present device could be implemented in any type of heating or cooling system where zones are used and it further could be implemented by any type of mechanical, electromechanical, or solid state technique. As such, the applicant wishes to be limited in the scope of his invention solely by the scope of the appended claims.

The embodiments of the invention in which an exclusive property or right is claimed are defined as follows:

1. A zone control system adapted to control temperatures in a building having a temperature modifying plant to modify the temperature of a heat exchange medium, circulator means to circulate said medium, and flow control means to regulate the flow of said medium, including: a plurality of zone thermostats with one thermostat per controlled zone, and with each thermostat including temperature responsive means and heat anticipator means to modify the temperature of said temperature responsive means; at least one of said flow control means per controlled zone, and each of said flow control means being capable of energizing said circulator means when said flow control means operates to permit circulation of said heat exchange medium; each zone thermostat including on-off timer means having normally open switch means, and further including intermediate on timer means having normally open switch means; first zone control circuit means including a temperature responsive means of said first thermostat, a heat anticipator means of said first thermostat, and circuit means with normally closed switch means capable of energizing a first flow control means to an open position upon said first thermostat calling for operation of said temperature modifying plant; said timer means of said first thermostat being actuated by said first thermostat calling for operation of said temperature modifying plant; a first of said on-off timer means operating its switch means to an on state after a fixed time interval to latch said first flow control means into an open condition; a first of said intermediate on timer means operating its switch means to an on state after a second fixed time interval to energize said modifying plant and complete a circuit to a secondary anticipation heater of a second zone thermostat capable of adding heat to said second zone thermostat; and said first on-off timer means maintaining its switch means closed for a fixed time interval after said first zone control circuit means is opened by the operation of said first thermostat to ensure that said first flow control means remains open for a fixed time to allow said circulator means to circulate said heat exchange medium.

2. A zone control system as claimed in claim 1 wherein said zone thermostats each have a bimetal temperature actuated switch, a resistive heat anticipator, and a resistive heater adjacent said heat anticipator.

3. A zone control system as claimed in claim 2 wherein said timer switch means includes mechanical contacts operated by said timer means.

4. A zone control system as claimed in claim 3 wherein said on-off timer switch means includes a relay, a relay operated contact, and connection means connected to latch said relay into an energized mode of operation upon said on-off timer switch means initially operating.

5. A zone control system as claimed in claim 1 wherein said timer means for each zone thermostat includes extended on timer means having a normally open switch means; and an extended on timer means of said first thermostat operating at a time interval after said first thermostat intermediate timer means to close said extended on timer means normally open switch means after said first thermostat calls for operation of said temperature modifying plant; operation of said extended on timer switch means causing an increased level of operation of said temperature modifying plant.

6. A zone control system as claimed in claim 5 wherein said zone thermostats each have a bimetal temperature actuated switch, a resistive heat anticipator, and a resistive heater adjacent said heat anticipator.

7. A zone control system as claimed in claim 6 wherein said timer switch means includes mechanical contacts operated by said timer means.

8. A zone control system as claimed in claim 7 wherein said on-off timer switch means includes a relay, a relay operated contact, and connection means connected to latch said relay into an energized mode of operation upon said on-off timer switch means initially operating.

\* \* \* \* \*